US005772145A

United States Patent [19]
Bareiss et al.

[11] Patent Number: 5,772,145
[45] Date of Patent: Jun. 30, 1998

[54] BELT RETRACTOR FOR VEHICLE SAFETY BELTS

[75] Inventors: Rainer Bareiss, Alfdorf; Jürgen Rink, Waldstetten, both of Germany

[73] Assignee: TRW Occupant Restraint Systems GmbH, Alfdorf, Germany

[21] Appl. No.: 762,388

[22] Filed: Dec. 9, 1996

[30] Foreign Application Priority Data

Dec. 22, 1995 [DE] Germany ................ 295 20 425.7 U

[51] Int. Cl.⁶ .................................................. B60R 22/415
[52] U.S. Cl. ................................................... 242/382.2
[58] Field of Search ........................... 242/382.2, 382.4, 242/382.1; 280/806, 807; 297/476, 478

[56] References Cited

U.S. PATENT DOCUMENTS 5,271,578  12/1993  Jabusch .
5,474,247  12/1995  Bareiss ................................. 242/382.2

FOREIGN PATENT DOCUMENTS 0535551  9/1992  European Pat. Off. .

OTHER PUBLICATIONS

European Search Report EP 96 11 9174.

*Primary Examiner*—John M. Jillions
*Attorney, Agent, or Firm*—Tarolli, Sundheim, Covell, Tummino & Szabo

[57] ABSTRACT

A belt retractor for vehicle safety belts to secure a child's seats or loads on a vehicle seat comprises a belt drum rotatably mounted in a housing and a locking mechanism for preventing rotation of the belt drum. A tripping mechanism is also provided, which has a coupling disk connected with the belt drum and provided with external gear teeth. A pawl is able to be selectively pivoted between an engagement position with the external gear teeth of the coupling disk and a normal position out of engagement with such external gear teeth. A ring of gear teeth is driven by the belt drum and two gear wheels are in mesh with said ring of gear teeth. The gear wheels are rotatably mounted on the ends of a rocking member, which is pivotally mounted on the housing. An actuating arm is connected with the rocking member for the operation of the pawl. Switching elements are provided on the periphery of the gear wheels and of the ring of gear teeth and abut against one another in permanently set relative angular positions of the gear wheels and of the ring of gear teeth, the rocking member being pivoted thereby. The switching elements comprise at least one switching tooth projecting beyond the periphery of one of the ring of gear teeth and the gear wheels and a closed tooth gap on the other of the ring of gear teeth and the gear wheels.

8 Claims, 5 Drawing Sheets

BELT RETRACTOR FOR VEHICLE SAFETY BELTS

The invention relates to a belt retractor for vehicle safety belts, and more particularly to a belt retractor comprising a child safety means, adapted to act independently of the locking device responsive to the vehicle and/or the belt webbing.

Such a belt retractor comprises a locking mechanism for preventing motion of the belt drum rotatably mounted in housing. For activation of the locking mechanism a trip mechanism is provided, which comprises an inertia disk, able to rotate to a limited extent in relation to the belt drum, coupled with an actuating disk, whose rotation relative to the belt drum trips the locking mechanism. For the activation of the child safety means a switching element is provided able to be switched over between two stable positions of switching and in the first switching trips the locking mechanism while in the second position it disengages it. The switching over of the switching element between the two positions of switching occurs in a fashion dependent on the amount of belt webbing wound on the belt drum, by stepping down the rotation of the belt drum by means of a transmission and converting it into the desired switching strokes.

In a belt retractor disclosed in the European patent publication 0 535 551 A2 the transmission comprises a main gear wheel locked in rotation with the belt drum and two auxiliary gear wheels rotatably mounted on the respective ends of a rocking member and constantly in mesh with the main gear wheel. The main gear wheels and the auxiliary gear wheels are provided with laterally arranged cams, which only strike each other in particular positions of relative rotation of the gear wheels and therefore switch over the rocking member from one stable switching position into the other one. An actuating arm is connected with the rocking member to operate a pawl pivotally mounted on the housing, said pawl cooperating with the external gear tooth of the actuating disk.

The fitting of the additional components necessary for such a child safety means in an existing belt retractor does however involve difficulties, more particularly because of the additionally necessary space required axially in relation to the belt drum.

The invention provides a belt retractor for vehicle safety belts, wherein the additional components necessary for realizing the child safety means may be integrated without any problems in an already existing design, more particularly on account of the small overall size axially in relation to the belt drum. In a conventional manner the belt retractor in accordance with the invention for vehicle safety belts comprises a belt drum rotatably mounted in a known manner in a housing, a locking mechanism for preventing rotation of the belt drum and a tripping mechanism, which comprises an inertia disk able to be rotated in relation to the belt drum to a limited extent and whose rotation in relation to the belt drum is arranged to activate the locking mechanism. Furthermore a switching pawl is present, able to be pivoted between a position in engagement with the external gear teeth of the operating disk and a normal position out of engagement with said external gear teeth. A ring of gear teeth driven by the belt drum is in mesh with gear wheels rotatably mounted on the ends of a rocker member pivotally mounted on the housing. An actuating arm is connected with the rocker member for operation of the switching pawl. Furthermore switching elements are provided on the periphery of the gear wheels and of the ring of gear teeth, which at permanently predetermined relative positions of rotation of the gear wheels and of the ring of gear teeth strike against each other, the rocking arm then being pivoted. In accordance with the invention the switching elements are designed in the form of radially extended switching teeth on the one hand and on the other hand as closed tooth gaps. These switching elements accordingly do not extend axially beyond the gear tooth ring and, respectively, the gear wheels and consequently do not require any additional axial space for the accommodation thereof.

A preferred embodiment of the invention is characterized by a particularly economical design in which the ring of gear teeth is arranged on a lateral surface of the coupling disk and more particularly comprises tooth elements formed on the lateral surface of the coupling disk. The ring of gear teeth preferably has a substantially larger diameter than the gear wheels and together with the rocker member the latter are located on the external periphery of the ring of gear teeth, where they may be arranged in one corner of the cover of the belt retractor in a space saving manner.

Further advantages and features of the invention will be gathered from the following description and the drawings, to which reference will be had.

Figure 1:
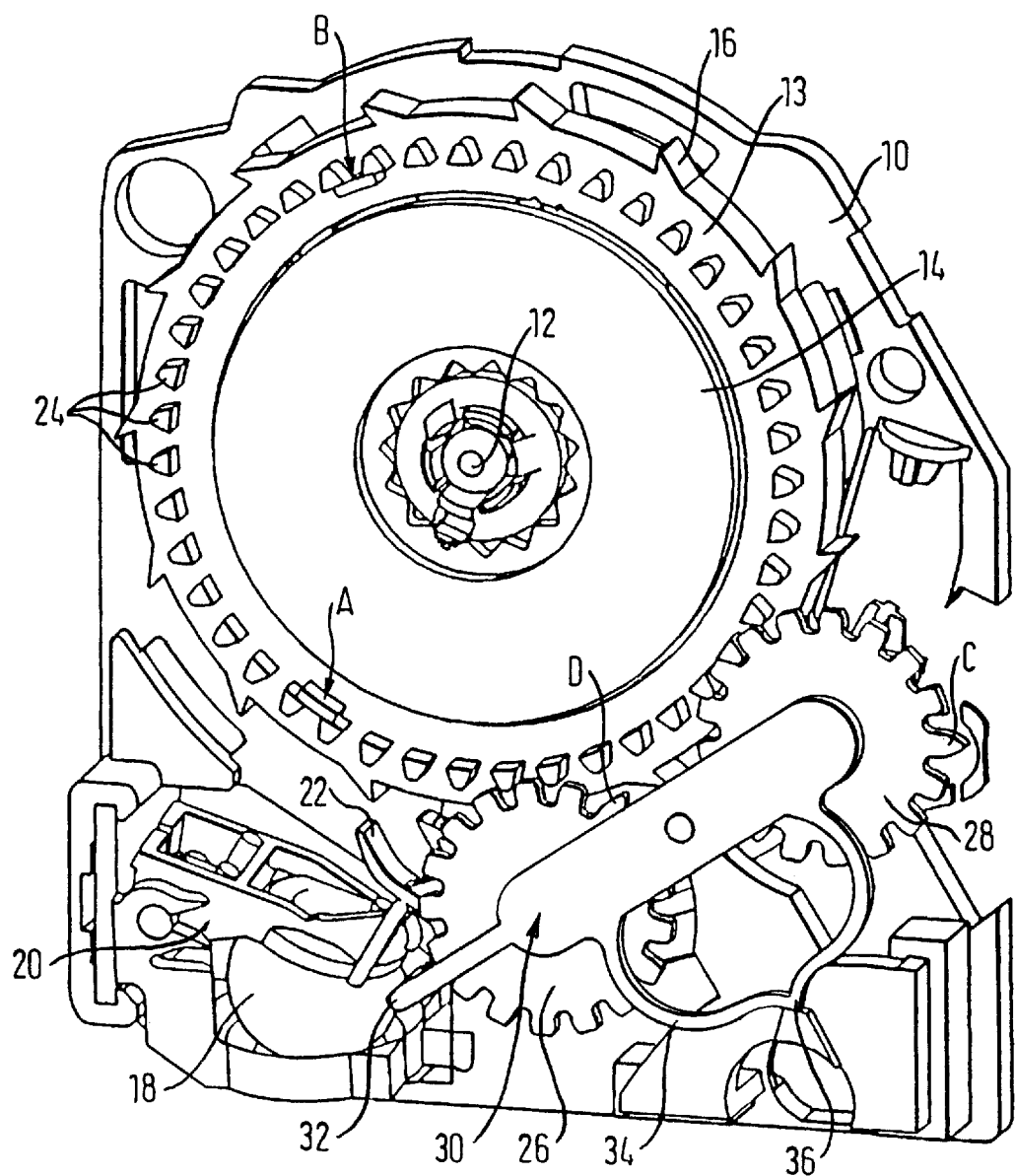
FIG. 1 shows a perspective side view of a first embodiment of the belt retractor, the belt webbing being practically completely unwound.

Of the belt retractor only the so-called control side is illustrated, on which the control mechanism responsive to the vehicle and the belt webbing for the locking mechanism is located. On the side of the housing of the belt retractor a bearing plate 10 is mounted. A coupling disk 13 is fixed and secured to a lateral stub shaft of the belt drum by a bearing trunnion 12. The coupling disk 13 is provided on its outer periphery with external gear teeth 16 and is coupled with an inertia disk 14. These external gear teeth cooperate in a conventional fashion with a ball sensor 18, on which a pivotable pawl 20 rests. A further pawl 22, which is pivotally borne on an operating lever 11 (FIG. 5), also cooperates with the external gear teeth 16 of the coupling disk 13 and can be pivoted between an engaged setting on such external gear teeth and a normal setting out of engagement with the external gear teeth.

Near the external periphery of the coupling disk 13 and on the lateral surface thereof a ring of gear teeth is formed by individually formed gear elements 24, which are peripherally spaced from one another. Such gear tooth ring constituted by the gear elements 24 is permanently in mesh with two gear wheels 26 and 28, which are rotatably mounted on respective ends of a pivotable rocking member 30. An elastic actuating arm 32 is connected with the rocking member 30 and also is in engagement with the pawl 22. In the position depicted in FIG. 1 the actuating arm 32 maintains the pawl 22 in its neutral position out of engagement with the external gear teeth 16 of the coupling disk 13. A spring bracket member 34 is furthermore provided on the rocking member 30 in order to cooperate with a detent spur 36 in such a manner that the rocking member 30 is able to assume any one of two possible positions of pivoting.

Two each of the gear tooth elements 24 are provided with a tooth gap which is closed by a bridge A and, respectively, B. Furthermore the gear wheels 26 and 28 respectively possess a radially extended tooth D and, respectively, C.

Figure 2:
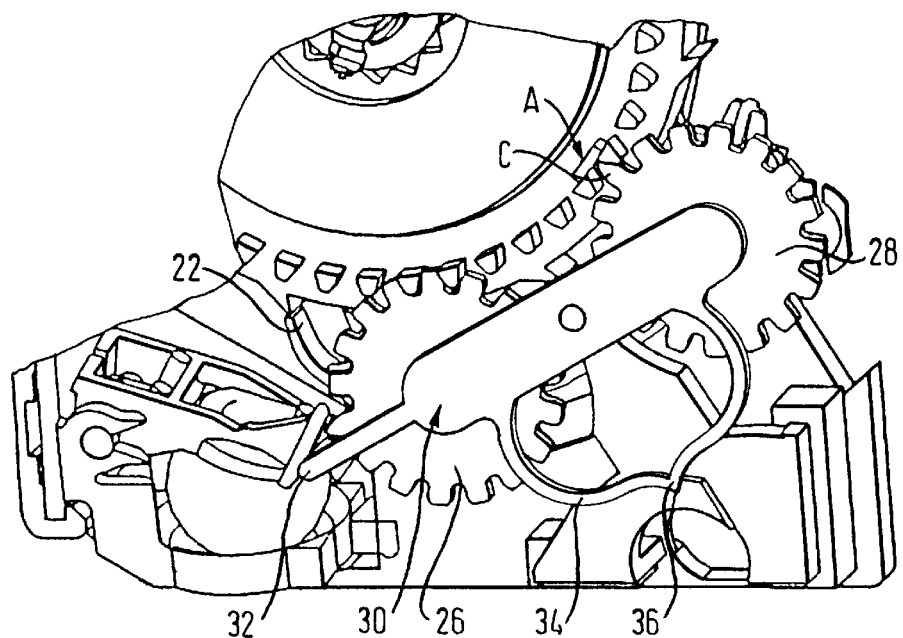
FIG. 2 shows a part of the same side view, the belt webbing being completely unwound.

A belt retractor with a child safety means is conventionally switched over between the normal operating function, in which the locking mechanism responds to the vehicle and the belt webbing, and the locking function, in which belt webbing may be wound up but may not be unwound, by unwinding the belt webbing completely from the belt drum. FIG. 1 shows the state directly prior to completion of unwinding of the belt webbing. The actuating arm 32 of the rocking arm 30 maintains the pawl 22 in its normal condition out of engagement with the external gear teeth 16 of the coupling disk 13. On further drawing of belt webbing, by which the coupling disk 13 is turned counter-clockwise, the bridge referenced A, which closes the gap between two adjacent tooth elements 24, is displaced as far as the gear wheel 28 where, the belt webbing having been completely unwound, it will strike against the extended tooth C, which is termed the turning on tooth. Owing to the abutment of the turning on tooth C against the bridge A the gear wheel 28 is repelled so that the rocking member 30 is pivoted. This condition is depicted in FIG. 2. The actuating arm 32 of the rocking member 30 now lifts the pawl 22 so that the pawl's tip projects into the path of motion of the external gear teeth 16 of the coupling disk 13.

Figure 3:
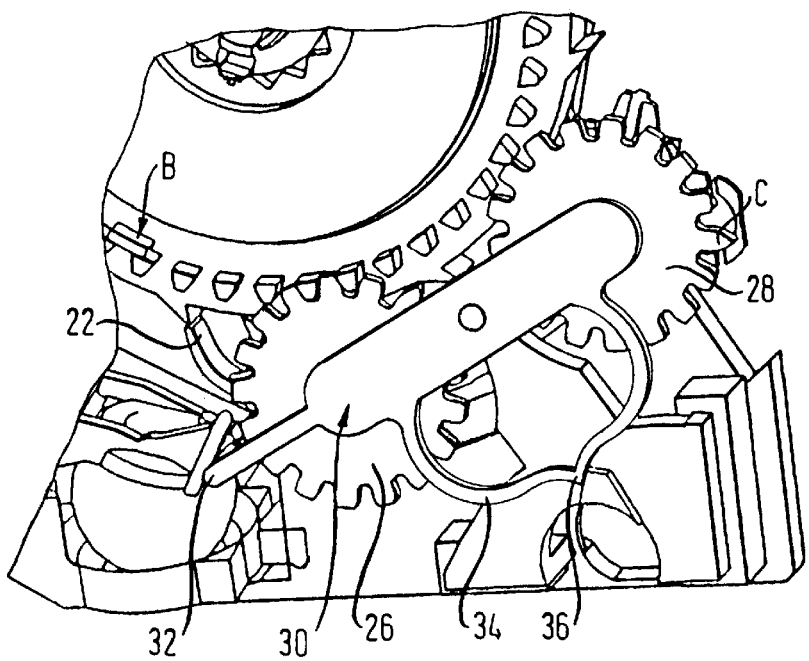
FIG. 3 is a corresponding partial view at the beginning of renewed winding up of the belt webbing.
Figure 4:
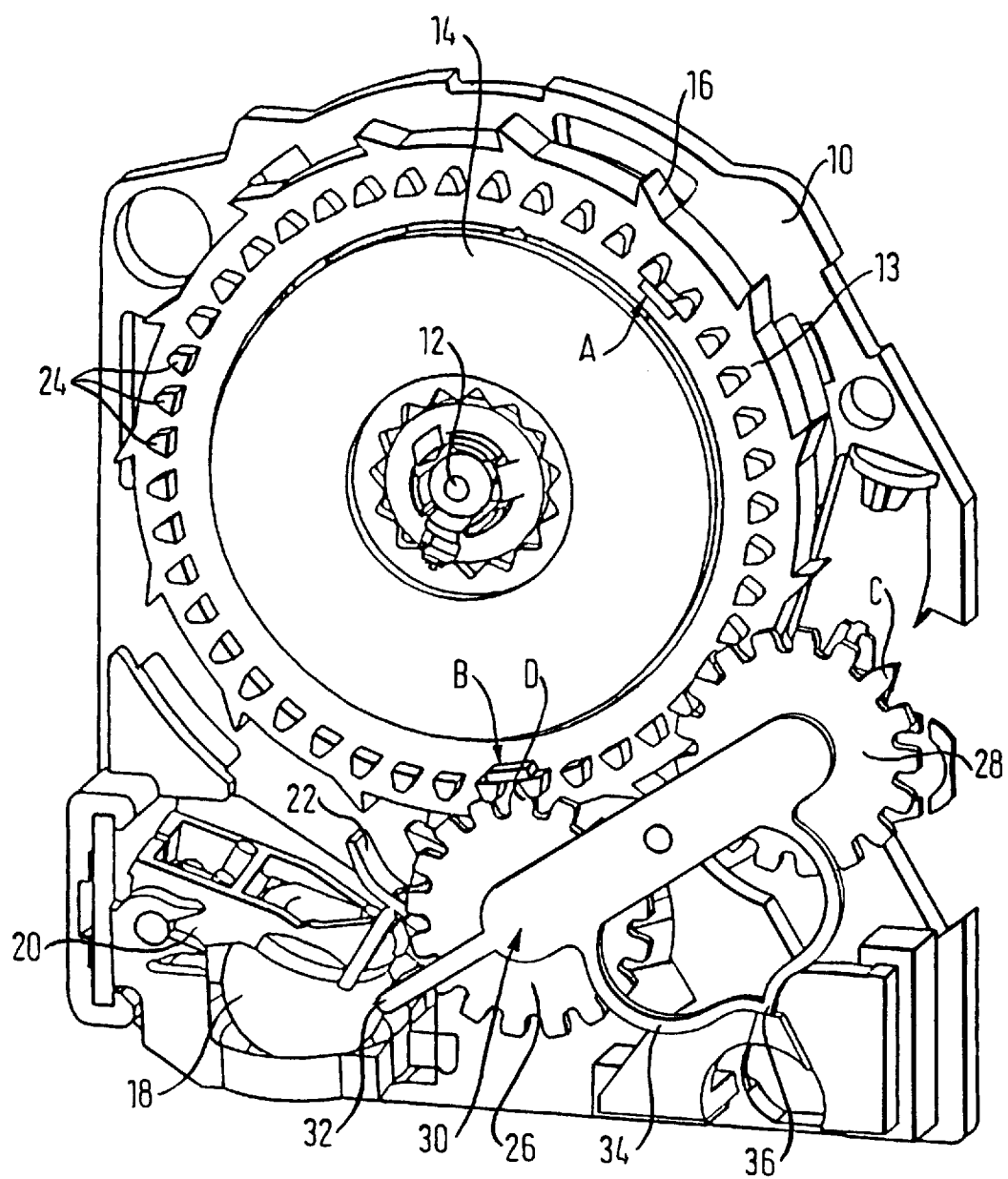
FIG. 4 is a side view corresponding to FIG. 1 with about one quarter of the belt webbing wound up.

After this the belt webbing is taken up on the belt drum again, the pawl 22 not opposing rotation of the coupling disk 13, since it is repelled by the backs of the external teeth 16, as is depicted in FIG. 3. When however belt webbing is drawn off again, the pawl 22 will prevent rotation of the belt drum 14 with the result that ultimately the locking mechanism (not illustrated) of the belt retractor will be activated. In this condition it is possible for child's seats or loads to be secured on a vehicle seat.

On unfastening the belt the belt webbing will be further wound up on the belt drum. When a predetermined amount of belt webbing, as for example 75% has been wound up again, the bridge B between two adjacent tooth elements will strike against the extended tooth D on the gear wheel 26, which is termed the turn off tooth. The gear wheel 26 is knocked radially outward and causes pivoting of the rocking member 30 into the other one of its two stable settings, the actuating arm 32 releasing the pawl 22. Normal function and operation of the belt retractor is now restarted.

Figure 5:
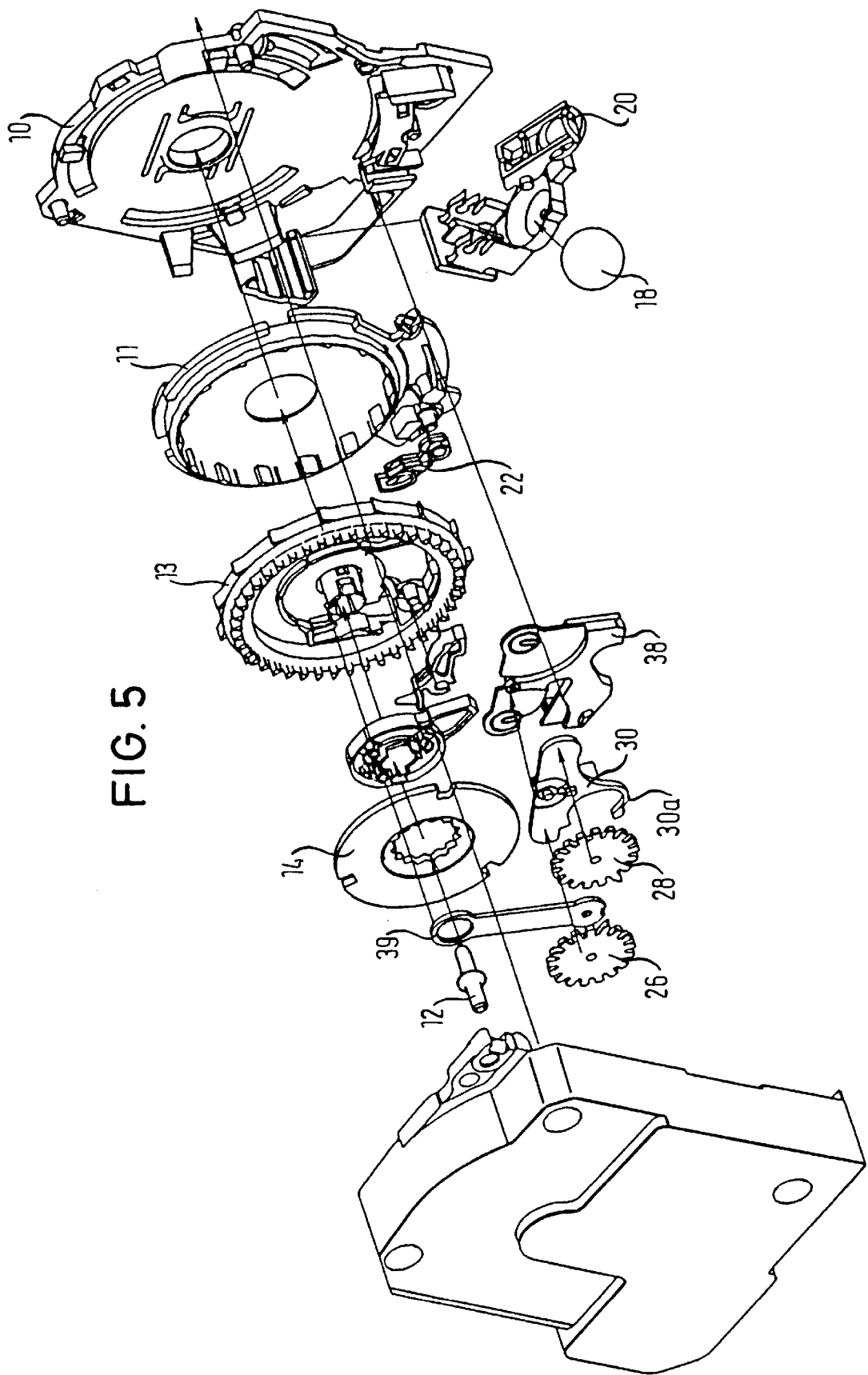
FIG. 5 is an exploded view of a preferred embodiment of the belt retractor.
Figure 6:
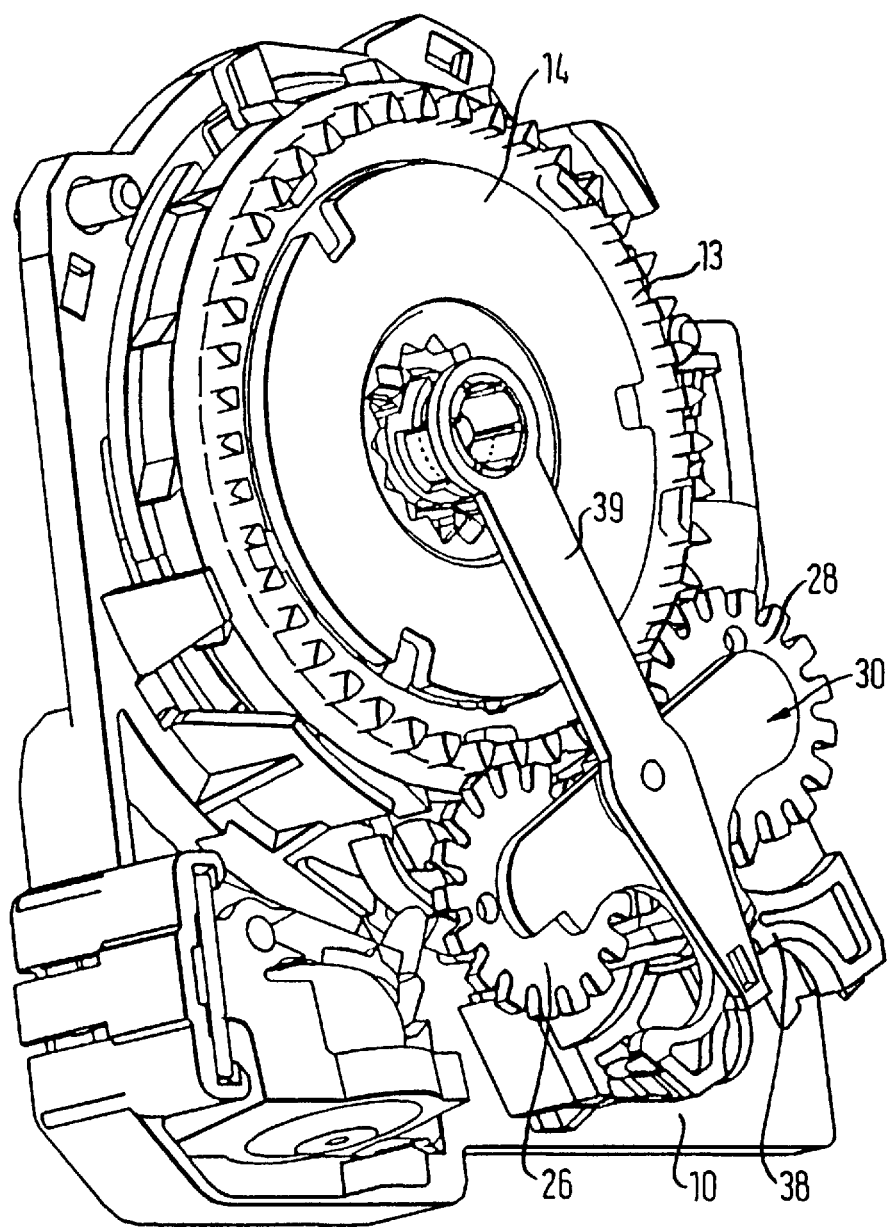
FIG. 6 shows a perspective partial view of the belt retractor.

In the case of the preferred embodiment of the belt retractor illustrated in FIGS. 5 and 6 the rocking member 30 is pivotally mounted on a bearing bracket 38, which for its part is movably mounted on the bearing plate 10. A link 39, whose one end is fitted around a hub of the coupling disk 13, has its opposite end connected with the pivot bearing of the rocking member 30 and accordingly holds same at a constant distance from the external periphery of the coupling disk 13. This feature means that increases in the play due to wear in the bearing of the belt drum will not have any effect on the distance between the rocking member 30 and the gear teeth on the external periphery of the coupling disk 13 so that the adjustment of the switching points is not interfered with.

As a departure from the previously described embodiment the rocking member 30 may be provided with a spring arm 30a, which in a manner similar to the spring bracket member 34 in the above described embodiment ensures the bistable behavior of the rocking member 30.

What is claimed is:

1. A belt retractor for vehicle safety belts comprising
   a) a belt drum rotatably mounted in a housing;
   b) a locking mechanism for preventing rotation of the belt drum;
   c) a tripping mechanism with a coupling disk connected with the belt drum and provided with external gear teeth;
   d) a pawl, which is able to be selectively pivoted between an engagement position with the external gear teeth of the coupling disk and a normal position out of engagement with such external gear teeth;
   e) a rocking member pivotally mounted on the housing and having two ends;
   f) a ring of gear teeth driven by the belt drum and two gear wheels in mesh with said ring of gear teeth, said gear wheels being rotatably mounted on the ends of the rocking member;
   g) an actuating arm connected with the rocking member for operation of the pawl; and
   h) switching elements provided on the periphery of the gear wheels and of the ring of gear teeth, said switching elements comprising at least one switching tooth projecting beyond the periphery of one of said ring of gear teeth and said gear wheels and a closed tooth gap on the other of said ring of gear teeth and said gear wheels, and said switching elements abutting against one another in permanently set relative angular positions of the gear wheels and of the ring of gear teeth, said rocking member being pivoted by abutment of said switching elements on each other.

2. The belt retractor as claimed in claim 1, wherein said ring of gear teeth is arranged on one lateral surface of the coupling disk.

3. The belt retractor as claimed in claim 1, wherein said ring of gear teeth comprises tooth elements formed on the lateral surface of the coupling disk.

4. The belt retractor as claimed in claim 3, wherein with the exception of the closed tooth gaps, the tooth elements are spaced from each other in the peripheral direction.

5. The belt retractor as claimed in claim 1, wherein said ring of gear teeth has a substantially larger external diameter than the gear wheels.

6. The belt retractor as claimed in claim 4, wherein said ring of gear teeth has a substantially larger external diameter than the gear wheels.

7. The belt retractor as claimed in claim 1, comprising a movable bearing bracket and a link connected with a hub of the coupling disk, wherein the rocking member is pivotally mounted on the moving bearing bracket which, by means of said link, maintains the rocking member at a constant distance from the external periphery on the coupling disk.

8. The belt retractor as claimed in claim 6 comprising a movable bearing bracket and a link connected with a hub of the coupling disk, wherein the rocking member is pivotally mounted on the moving bearing bracket which, by means of said link, maintains the rocking member at a constant distance from the external periphery on the coupling disk.

* * * * *